(12) United States Patent
Sturges et al.

(10) Patent No.: US 7,319,404 B2
(45) Date of Patent: Jan. 15, 2008

(54) NON-INVASIVE, LOW COST METHOD AND APPARATUS FOR THE TRANSMISSION, DISPLAY AND DETECTION OF INTERNAL COMPUTER STATUS

(75) Inventors: Stephen S. Sturges, Portland, OR (US); Brad Inman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 592 days.

(21) Appl. No.: 10/881,093

(22) Filed: Jun. 29, 2004

(65) Prior Publication Data
US 2006/0016384 A1 Jan. 26, 2006

(51) Int. Cl.
G08B 21/00 (2006.01)
G06F 9/00 (2006.01)
G06F 15/177 (2006.01)
G06F 1/00 (2006.01)
G06F 11/30 (2006.01)

(52) U.S. Cl. .................. 340/635; 340/641; 713/2; 713/340

(58) Field of Classification Search .......... 340/635, 340/539.1, 850–999, 641, 653, 679, 654, 340/531; 714/1–824; 713/1–601; 700/27
See application file for complete search history.

(56) References Cited

U.S. PATENT DOCUMENTS

| 5,031,178 | A | | 7/1991 | Hartman | |
|---|---|---|---|---|---|
| 5,574,423 | A | * | 11/1996 | Vosika et al. | 340/333 |
| 5,805,793 | A | * | 9/1998 | Green | 714/32 |
| 6,067,013 | A | * | 5/2000 | Pejic | 340/539.1 |
| 6,239,716 | B1 | * | 5/2001 | Pross et al. | 340/815.4 |
| 6,694,204 | B1 | * | 2/2004 | Bair et al. | 700/108 |
| 6,763,456 | B1 | * | 7/2004 | Agnihotri et al. | 713/2 |
| 6,802,032 | B1 | * | 10/2004 | Budinger et al. | 714/46 |
| 6,910,157 | B1 | * | 6/2005 | Park et al. | 714/36 |
| 7,082,528 | B2 | * | 7/2006 | Zaudtke et al. | 713/2 |
| 2002/0144191 | A1 | | 10/2002 | Lin | |

FOREIGN PATENT DOCUMENTS

| FR | 2 462 064 | 7/1980 |
|---|---|---|
| WO | WO 96/07964 | 3/1996 |

OTHER PUBLICATIONS

Int'l Search Report for PCT/US2005/021786, mailed Oct. 20, 2006, 4 pages.

* cited by examiner

Primary Examiner—Benjamin C. Lee
Assistant Examiner—Jennifer Mehmood
(74) Attorney, Agent, or Firm—Blakely, Sokoloff, Taylor & Zafman LLP

(57) ABSTRACT

A method and apparatus for permitting diagnostics in a PC is described. Signals, imperceptible to a user, are transmitted through the LED used to indicate on/off power status. A small hand-held device may be used for detecting and interpreting the signals and to provide a visual indication to the user of a particular problem.

7 Claims, 4 Drawing Sheets

NON-INVASIVE, LOW COST METHOD AND APPARATUS FOR THE TRANSMISSION, DISPLAY AND DETECTION OF INTERNAL COMPUTER STATUS

FIELD OF THE INVENTION

The invention relates to the field of detecting and displaying computer status such as diagnostic status.

PRIOR ART

There are several troubleshooting techniques available for personal computers (PCs) that rely upon the PC operating, at least to some extent, to provide self-diagnostic data.

One such troubleshooting technique decodes the port 80 diagnostic data used on nearly all PCs. A board mounted in the computer is used to decode signals and provide an indication of problems to a display on the board. This display in some cases includes a plurality of LEDs. For example, should the PC hang on power-up self-test (POST) an indication of the last component tested, the address or code at failure or other diagnostic information can be provided.

A limited set of failure mode indicators, in some computers, are provided directly to a user through audible tones or beeps. For example, a sequence of beeps 1-3-1 for some POST code could indicate an error in the DRAM refresh test.

DETAILED DESCRIPTION

A method and apparatus for detecting and displaying, particularly computer diagnostic information, is described. In the following description, specific details, such as specific waveforms, are set forth to provide a thorough understanding of the present invention. It will be apparent to one skilled in the art that the present invention may be practiced without these specific details. In other instances, well-known circuits and code are not set forth in order not to unnecessarily obscure the present invention.

In general, a user of a computer is provided with very little information about diagnostic tests that the computer may run as part, for instance, of the power-up self-test (POST). The beep tones that some computers provide are painfully difficult to interpret. The more detailed information provided, for example, by a port 80 card, requires opening the computer, and in many instances, requires a skilled technician to understand it.

Figure 1:
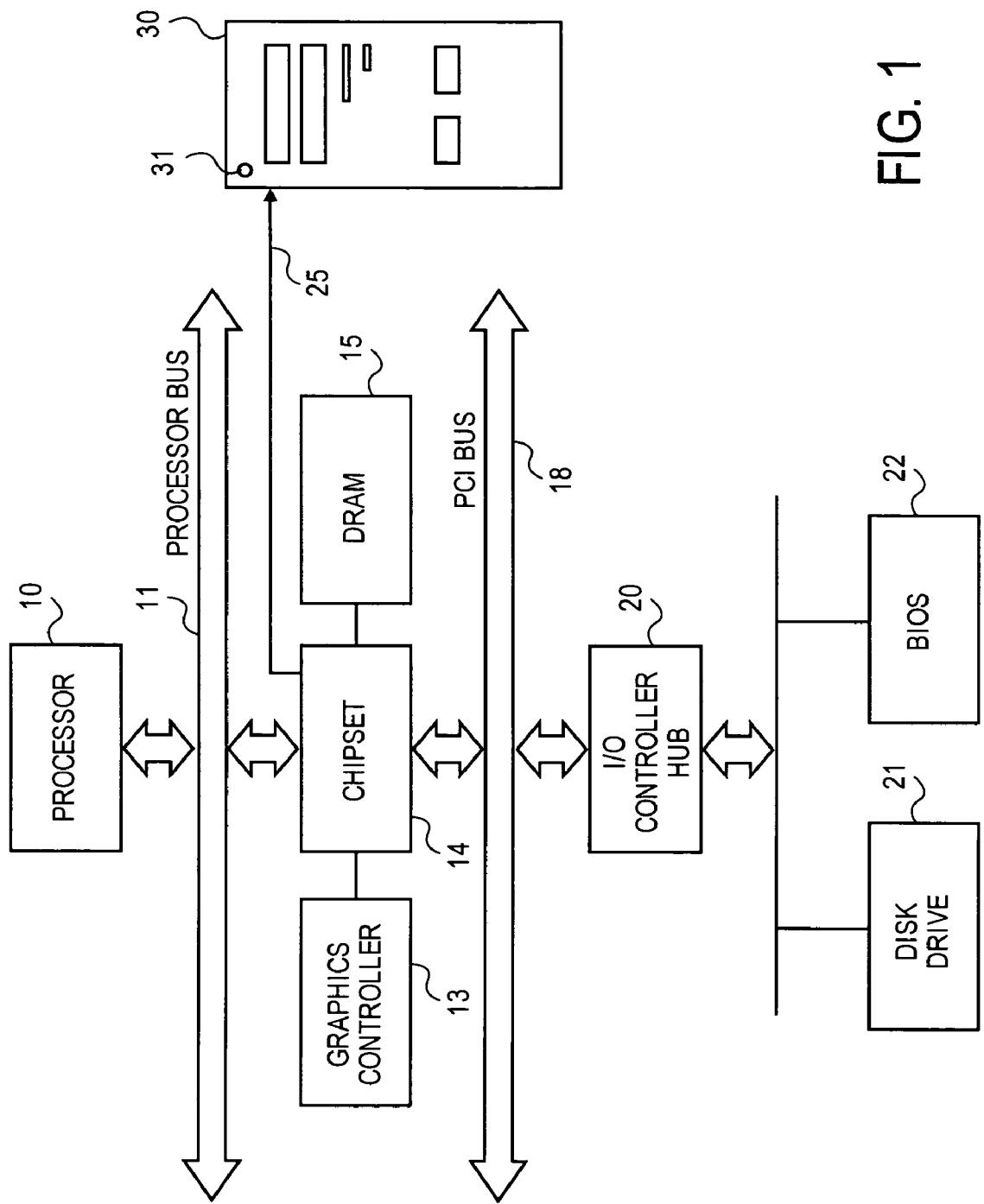
FIG. 1 is a block diagram of a PC which illustrates a connection to an indicator light on the front panel of a computer.

Referring now to FIG. 1, a block diagram for a PC is illustrated. It includes a processor 10 which may be a Pentium® processor manufactured by Intel Corporation. The processor 10 is connected to a processor bus 11. As is typically the case, the processor bus 11 interfaces with a chipset 14, which may be an ordinary chipset with an additional circuit, which will be described in conjunction with FIG. 2. The chipset typically interfaces with the dynamic random access memory (DRAM) 15 and a graphics controller 13.

The chipset also interfaces through a PCI bus 18 with an I/O controller hub 13. Connected to this hub are devices such as a disk drive 21 and a BIOS 22.

The BIOS 21 is typically a read-only memory or flash memory containing the basic input/output system, that is, the basic code for the computer. This code provides basic functionality, and enables some operability even if, for example, the disk drive 21 has failed. The BIOS 21 typically includes the POST code. As the POST code is executed, it may report a failure, for example, to the previously mentioned port 80 card.

While not shown in FIG. 1, in many PCs, a Super I/O card is used which provides, among other things, a signal to drive an indicator light (often a light emitting diode) mounted on the front of the computer. This is shown as light 31 on the front panel 30 of the computer tower. The tower in most cases includes a motherboard which contains many of the circuit components of FIG. 1. The disk drive 21 as well as other drives are mounted within the tower. Also, the tower provides an interface for a display and connections for other peripherals, such as a keyboard. While a computer with a tower is shown in the drawings, the present invention may be used with a lap top, handheld, or other computer.

The super I/O chip in many cases provides the signal to drive the light emitter diode (LED) 31. This LED provides the user with an indication of the power status of the computer. Often, the LED indicates both "off" and "on" status as well as an intermediate status, the standby status. For example, the LED may be off (no illumination) for the "off" status, at full intensity for the "on" status, and slowly blinking or at an intermediate intensity for the standby status.

Figure 2:
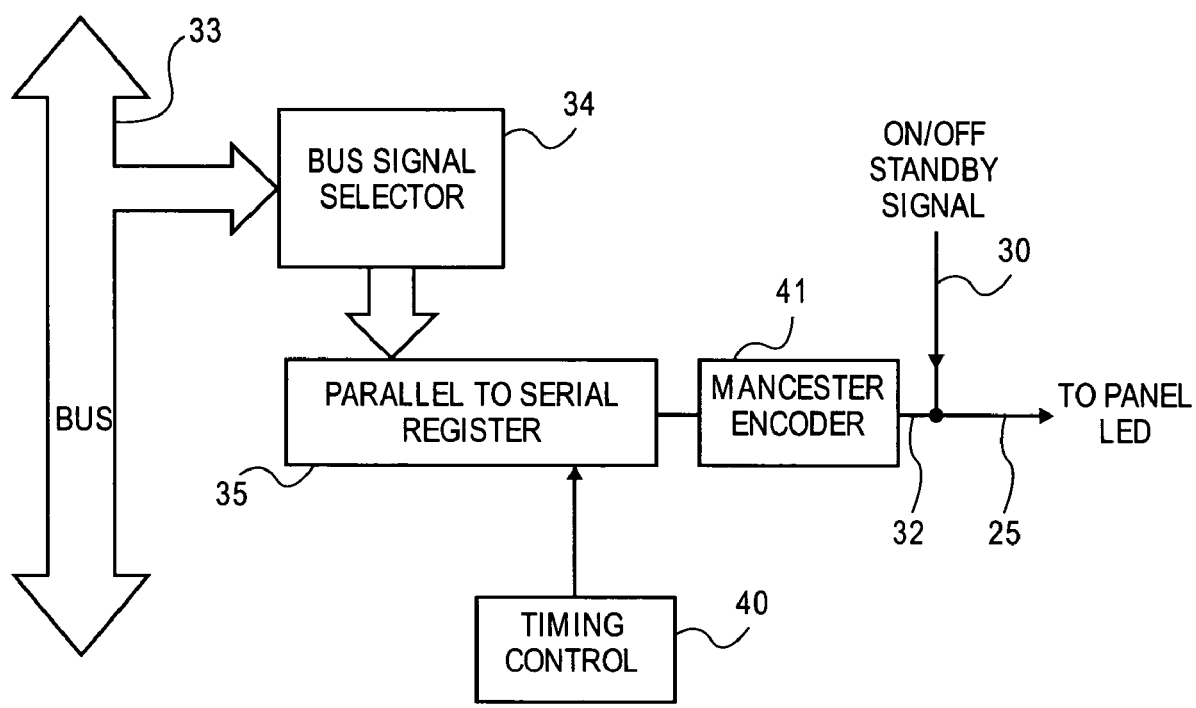
FIG. 2 is a block diagram for a circuit that provides signals to the indicator light of FIG. 1.

The line 30 of FIG. 2 provides the LED 31 with a first signal on line 30, indicating the power status such as "on", "off" or standby. A second signal on line 32, also connected to the LED 31, provides a serial digital signal at a high rate so that it is imperceptible to the user, as will be discussed.

Figure 6:
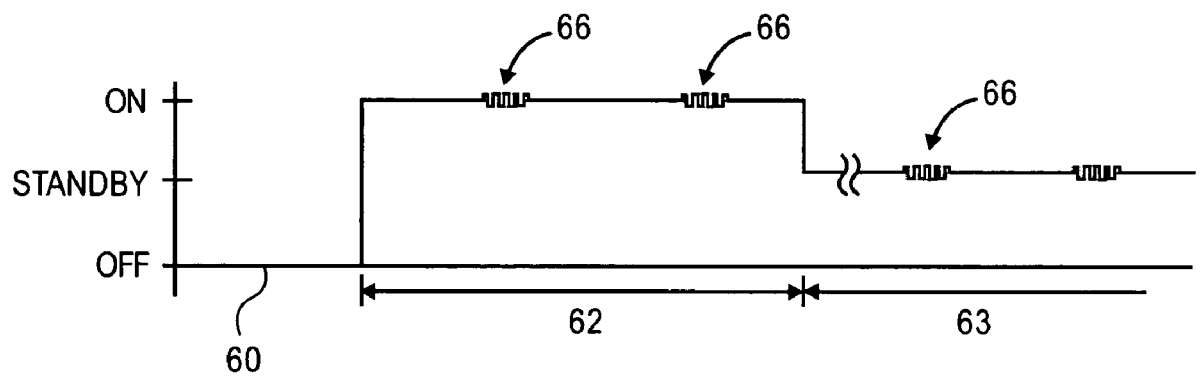
FIG. 6 illustrates the combined power status signal and serial bit stream provided to the indicator light of FIG. 1.

A typical signal that may be coupled to the LED 31 on line 25 is shown in FIG. 6. The DC portions of the signal in FIG. 6 have three levels, one shown for the period 60, a second for the period 62, and a third for the period 63. The first level during period 60, representing 0DC, does not provide power to the LED and indicates an "off" status. The "on" status is indicated by the DC level during the period 62 at which time the LED is fully illuminated. The standby power status is indicated by the period 63 where an intermediate DC signal is supplied to the LED indicating the standby power status. As mentioned earlier, this status may also be indicated by blinking, that is, by alternating the "on" and "off" status.

Bursts of digital data are transmitted with the power status signal at a high frequency, for instance, in the range of 500 KHz to 2 MHz. These bursts of digital data occur so quickly, and so infrequently, from a human observer's standpoint, that they are imperceptible. It is contemplated, by way of example, that the bursts occupy only approximately 5% of the "on" or standby time. Moreover, while in FIG. 6, the bursts 66 are shown having relatively small amplitude compared to the DC "on" potential and standby potential, in practice the bursts of digital signals may cause the LED to go from full-on to full-off. A specific waveform 40 for a burst 66 for one embodiment, will be discussed in conjunction with FIG. 5.

Referring now to FIG. 2, the circuit represented may conveniently be included within the chipset 14 as part of an integrated circuit. Preferably, a single pin or contact from an integrated circuit is used, as indicated by line 25, to provide a signal to the LED 31. This signal ideally includes both the power status signal and the bursts of serial digital data. Consequently, the circuits now found on, for example, the Super I/O chip for providing the "on," "off," standby power status signal may be incorporated onto an integrated circuit of the chipset. Alternatively, a line 32 from the circuit in the chipset providing the serial digital data may be combined with a signal from the Super I/O chip shown as line 30, to provide a single signal on line 25. This is less desirable since it requires a line and possibly a component on the motherboard.

As indicated earlier, the serial digital signal represents computer status information. For instance, it may represent, as mentioned, diagnostic information associated with the POST code. The status information may include identification numbers or serial numbers of components within the computer. Information useful for determining the nature of a failure, identifying a component that needs to be replaced, or about an event that caused a failure, may be sent.

The circuit of FIG. 2 receives the data in a parallel form from bus 33. The bus 33 may provide direct coupling to the PCI bus 18 and/or the processor bus 11. The bus 33 may be an address bus, a data bus, a multiplex bus, or include both a data and an address bus. A bus signal selector 34 selects signals from the bus 33 and couples them to the parallel-to-serial register 35. An ordinary gating circuit may be used for the selector 34.

In one embodiment, the selector 34 operates under software control and selects signals from the bus 33 at designated points in the execution of, for instance, the BIOS code. The signals indicate the status or operability of various components as they are checked during POST code execution. Alternatively, if an unexpected cessation of execution occurs, the address at which the execution halted can be sent to the register 35. This may be used to determine the nature of the failure. Software can also place onto the bus 33 or into the register 35, identifiers for the components (for example, for failed components) such as serial numbers, model numbers, and configuration status.

The timing control 40 provides clock signals to the register 35. An ordinary clocking circuit operating from the chipset's timing signal may be used. The clock signals from control 40 serially shifts-out the bits placed into the register 35 in parallel form from the bus 33. The clocking rate at which the data is shifted out of the register 35, as mentioned, may be in the range of 500 KHz to 2 MHz. In addition, as will be discussed in conjunction with FIG. 5, the initial bit and final bit of a burst may be made to have a longer duration (lower frequency) in order to identify the start and stop of a burst of data. Moreover, since the data is ideally encoded in a self-clocking code, some data can be transmitted at one frequency and other data at a different frequency. Thus, software may control the timing control 40 to cause it to transmit the data at different frequencies depending on the nature of the data. This allows the same code to represent different status information simply by identifying the frequency at which it is transmitted.

The parallel-to-serial register 35 may contain any number of bits. For instance, 8 bits may be used which would typically be less than an entire bus 33 width. Thus, the diagnostic information, for example, may be placed on only certain lines of the bus. Alternatively, the register may be wider than the bus, and several bus cycles of data may be loaded into the register 35 for transmission in a single burst. Consequently, the bursts may contain, for example, 4 kbits.

As illustrated in FIG. 2, the output of the register 35 is coupled through a Manchester encoder 41. Manchester encoding may be one of the encoding techniques used to provide the self-clocking. Other encoding that allows for clock recovery may be used. Additionally, error correcting codes and/or parity bits may be transmitted with the burst to assure the integrity of the transmitted data. These also may be added, as is well-known, by the encoder 41.

Often in PCs, a light emitting diode (LED) is used to indicate the power status. Tests on these LEDs has found that many will operate at frequencies in excess of 2 MHz, even though they are not specified for such applications. In implementing the present invention, the indicator 31 should be able to transmit bursts of data so that they may be detected.

Figure 3:
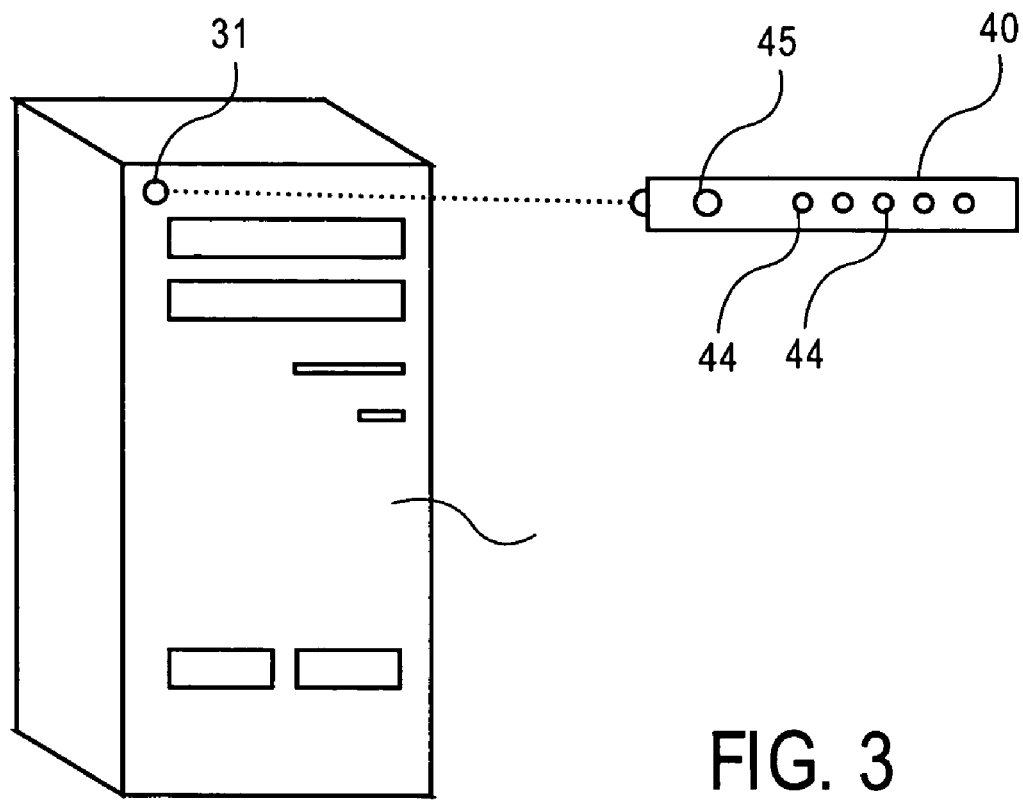
FIG. 3 is a drawing of a computer tower and a hand-held diagnostic device.
Figure 4:
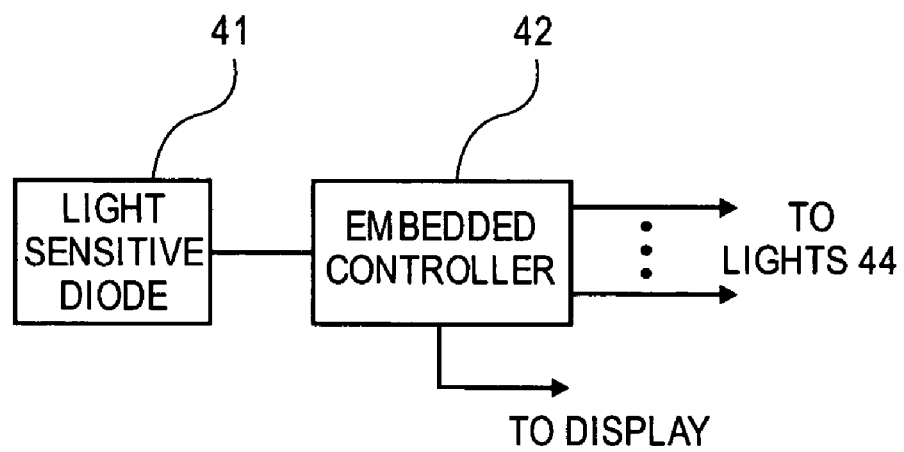
FIG. 4 is a block diagram of components internal to the hand-held device of FIG. 4.

As shown in FIG. 3, a hand-held device 40, by way of example, having a pen shape, is used to detect the otherwise imperceivable data burst from the LED 31. The hand-held device 40 includes, as shown in FIG. 4, a light sensitive diode 41 which provides an electrical signal representative of the data transmitted by the LED 31. This signal is connected, in one embodiment, to an embedded controller or a processor 42. The controller/processor 42 includes a serial port for receiving the serial data, including circuitry for recovering the clock signal, and for decoding the signals from the diode 41. These signals can then be compared to signals stored within a non-volatile storage area of the controller or a memory connected to a processor, or otherwise interpreted, by the controller/processor to indicate the transmitted status or other information. A field programmable gate array (FPGA), or other programmable logics such as the commercially available CPLDs may be used in place of the controller or processor 42.

In one embodiment, the controller/processor 42 drives a plurality of lights 44 shown in FIG. 3. If a failure occurs, by way of example, the computer may send a burst to the device 40 indicating the nature of the failure. Then, different combinations of the lights may be illuminated to indicate different failures. A chart may be provided to allow a user to interpret the combination of illuminated lights in order to identify a particular failure. Additionally as shown in FIG. 3, the hand-held device may include an on/off button 45 used to power-up the hand-held device and/or to reset the device.

Alternatively, the embedded controller/processor 42 may provide a signal to a display permitting the display to provide a readout to the user indicating, for instance, "disk drive failure."

In another embodiment, the light sensitive diode is included in a larger hand-held device than a pen such as a palm-size device which includes an integral display, controller or processor, and a light detection device. This allows for more information such as serial number, part number and the like to be displayed.

Figure 5:
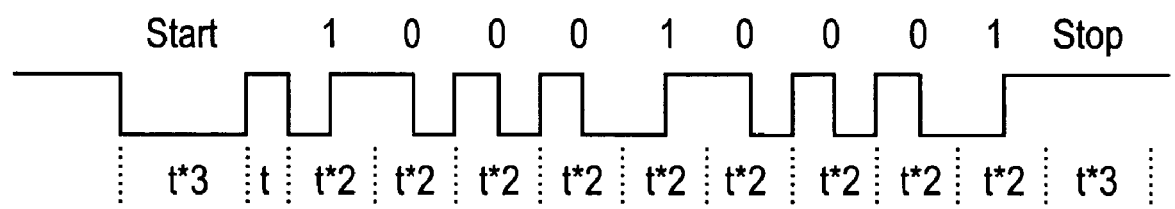
FIG. 5 illustrates a waveform that is transmitted by the indicator light of FIG. 1.

In FIG. 5, a single burst of data is shown containing 8 bits and a parity bit. A clock rate "t" is employed for this transmission. An initial pulse equal to three clock periods is used to indicate the start of the burst. Likewise, a duration of three clock periods, but with an opposite polarity signal, is used to indicate the end of the burst. The packet of data transmitted during the burst is Manchester encoded as illustrated in FIG. 5, thus allowing transmission without a separate clock signal, since the clock signal is recovered from the data itself.

Thus, a method and apparatus has been described which allows the generation of a diagnostic signal or other information signals with low overhead in the computer. The signal is easily encoded and transmitted to an inexpensive device for reading an interpretation.

What is claimed is:

1. A computer system comprising:
   a computer comprising:
   an indicator light, visible to a user, indicating power status of the computer;
   a converter for converting a parallel digital signal to a serial digital signal, coupled to the indicator light, the converter providing the serial signal causing the indicator light to blink at a rate that is not perceivable to the user; and
   a selector circuit for selecting predetermined parallel digital signals which represent BIOS power-up self-test (POST) code data for the computer, coupled to the converter; and
   a hand-held device comprising:
   a light sensing receiver which detects the blinking of the indicator light; and
   a processor coupled to the light sensing receiver for converting the serial digital signal, which represents BIOS POST code data, into a human perceivable form.

2. The system defined by claim 1, wherein the hand-held device includes a plurality of lights coupled to the processor for providing the user with the human perceivable form of the serial digital signal.

3. The system defined by claim 1, wherein the hand-held device includes a display.

4. The system defined by claim 1, wherein the converter providing the serial digital signal, provides a signal having a plurality of bits, some of which have a longer period than others to enable detection of a packet boundary.

5. The system of claim 1, wherein the indicator light indicates an "on" or "off" power status for the computer.

6. The system of claim 1, wherein the indicator light indicates an "on", "off" or standby power status for the computer.

7. The system defined by claim 4, wherein the serial digital signal is provided in bursts.

* * * * *